US007370043B1

(12) United States Patent
Shelton et al.

(10) Patent No.: US 7,370,043 B1
(45) Date of Patent: May 6, 2008

(54) METHOD AND SYSTEM FOR UPGRADE VALIDATION OF DATABASE QUERY PLANS

(75) Inventors: Jeffrey Scott Shelton, Ramona, CA (US); Douglas P. Brown, Rancho Santa Fe, CA (US); Joshua I. Mereminsky, San Diego, CA (US)

(73) Assignee: Teradata US, Inc., Miamisburg, OH (US)

( * ) Notice: Subject to any disclaimer, the term of this patent is extended or adjusted under 35 U.S.C. 154(b) by 515 days.

(21) Appl. No.: 10/878,277

(22) Filed: Jun. 28, 2004

(51) Int. Cl.
*G06F 17/30* (2006.01)

(52) U.S. Cl. ............................. 707/4; 707/2; 707/200; 717/168

(58) Field of Classification Search .................. 707/2, 707/3, 5, 10, 202, 4, 200, 203; 717/168, 717/171, 172, 173
See application file for complete search history.

(56) References Cited

U.S. PATENT DOCUMENTS

| | | | | |
|---|---|---|---|---|
| 5,873,079 A * | 2/1999 | Davis et al. ................... | 707/3 |
| 5,950,188 A * | 9/1999 | Wildermuth ................... | 707/3 |
| 6,618,719 B1 * | 9/2003 | Andrei ........................... | 707/2 |
| 6,738,756 B1 | 5/2004 | Brown et al. .................. | 707/2 |
| 7,010,521 B2 * | 3/2006 | Hinshaw et al. ............... | 707/3 |
| 7,162,472 B2 * | 1/2007 | Galindo-Legaria et al. .... | 707/4 |
| 7,185,000 B1 * | 2/2007 | Brown et al. .................. | 707/3 |
| 7,246,111 B1 * | 7/2007 | Chaware et al. ............... | 707/3 |
| 2003/0149970 A1 * | 8/2003 | Shanbhogue et al. ....... | 717/170 |
| 2004/0167891 A1 * | 8/2004 | Galindo-Legaria et al. .... | 707/3 |
| 2005/0210010 A1 * | 9/2005 | Larson et al. .................. | 707/3 |

OTHER PUBLICATIONS

Ghosh et al., Global Implementation of ERP Software—Critical Success Factors on Upgrading Technical Infrastructure, Engineering Management Conference, 2003. IEMC '03, Managing Technology Driven Organization Side of Innovation and Change, Nov. 2-4, 2003, pp. 320-324.*
NCR Corporation, Teradata Performance Services, Brochure, 2002.

* cited by examiner

*Primary Examiner*—Greta L Robinson
(74) *Attorney, Agent, or Firm*—Baker Botts, LLP (57) ABSTRACT

A method, computer program, and system are disclosed for validating query plans for an upgrade. Environment information corresponding to a target system is received. A query used on the target system is received. A target query plan generated by the target system is received. The query and the environmental information are imported into a test system. The test system corresponds to an upgrade of the target system. A test query plan is generated for the query using the test system. The target query plan is compared with the test query plan.

35 Claims, 6 Drawing Sheets

METHOD AND SYSTEM FOR UPGRADE VALIDATION OF DATABASE QUERY PLANS

BACKGROUND

Query optimization is important in relational database systems that deal with complex queries against large volumes of data. Unlike earlier navigational databases, a query on a relational database specifies what data is to be retrieved from the database but not how to retrieve it. Optimizing a query against a relational database is not as important in transaction-oriented databases where only a few rows are accessed either because the query is well specified by virtue of the application or because the query causes the data to be accessed using a highly selective index. In decision support and data mining applications, where the space of possible solutions is large and the penalty for selecting a bad query is high, optimizing a query to reduce overall resource utilization can provide orders of magnitude of overall performance improvement.

When a database system using a version of database management software is often subject to one or more particular SQL queries, an upgrade of the database management software can have substantial impact on the performance of those SQL queries. When one or more of the SQL queries is negatively impacted by the software upgrade, i.e., the estimated cost of system resources for executing the query rises, the value of the database system to the company using it can be reduced until a the problem can be identified and a fix implemented.

SUMMARY

In general, in one aspect, the invention features a method for validating query plans for an upgrade. Environment information corresponding to a target system is received. A query used on the target system is received. A target query plan generated by the target system is received. The query and the environmental information are imported into a test system. The test system corresponds to an upgrade of the target system. A test query plan is generated for the query using the test system. The target query plan is compared with the test query plan.

In general, in another aspect, the invention features a computer program for validating query plans for an upgrade. The program includes executable instructions that cause at least one computer to receive environmental information corresponding to a target system. A query used on the target system is received. A target query plan generated by the target system is received. The query and the environmental information are imported into a test system. The test system corresponds to an upgrade of the target system. A test query plan is generated for the query using the test system. The target query plan is compared with the test query plan.

In general, in another aspect, the invention features a system for validating query plans for an upgrade. The system includes an interface to receive environment information corresponding to a target system, a query used on the target system, and a target query plan generated by the target system. A test system using an upgraded version of database software used by the target system is configured in accordance with the environment information. The test system includes an optimizer module that is coupled to the interface to receive the query and generates a test query plan. The system includes a query plan comparison tool coupled to the test system and the interface to receive the test query plan and the target query plan and configured to display a comparison of the plans.

DETAILED DESCRIPTION

Figure 1:
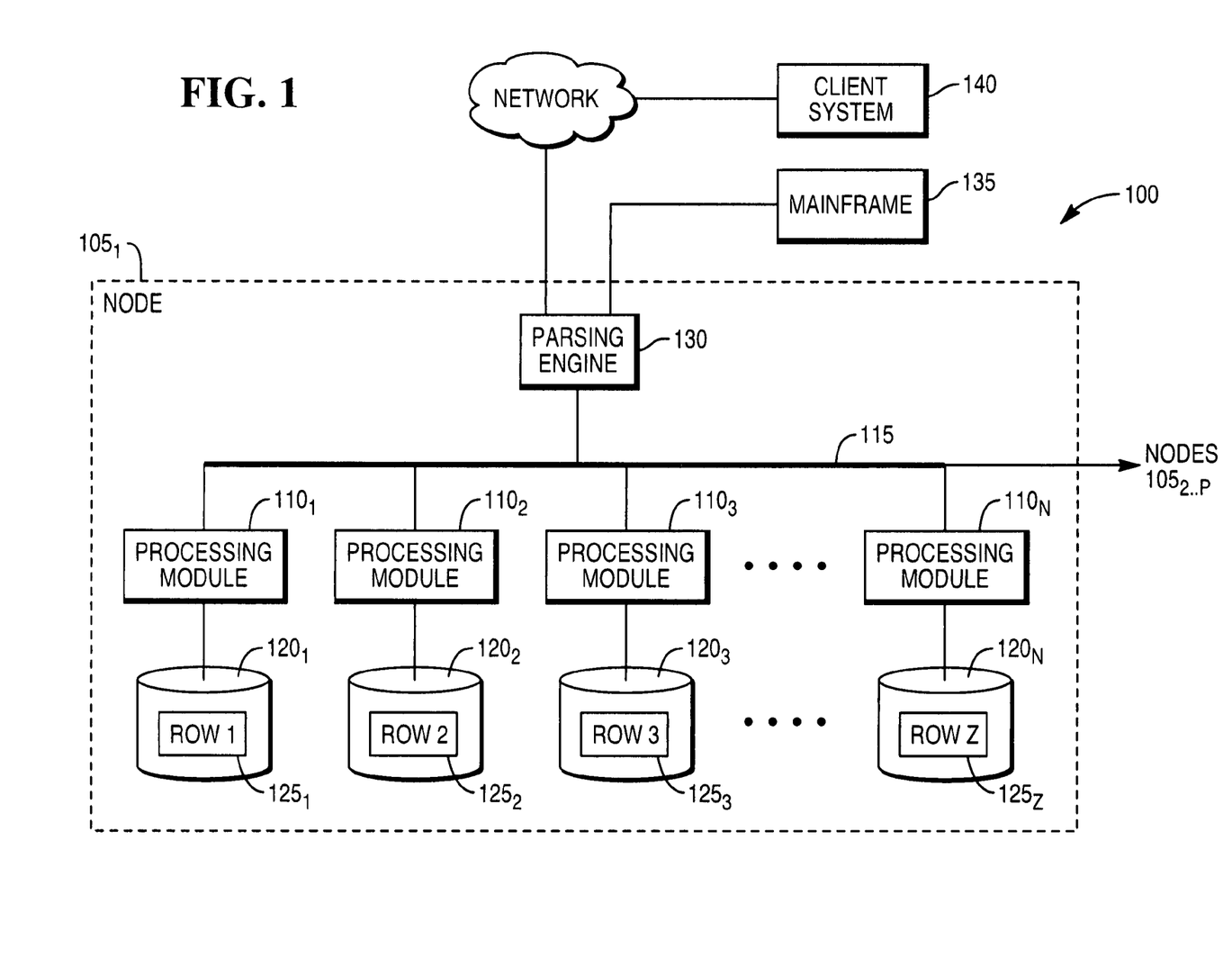
FIG. 1 is a block diagram of a node of a parallel processing database system.

The upgrade validation technique disclosed herein has particular application, but is not limited, to large databases that might contain many millions or billions of records managed by the database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots P}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 2:
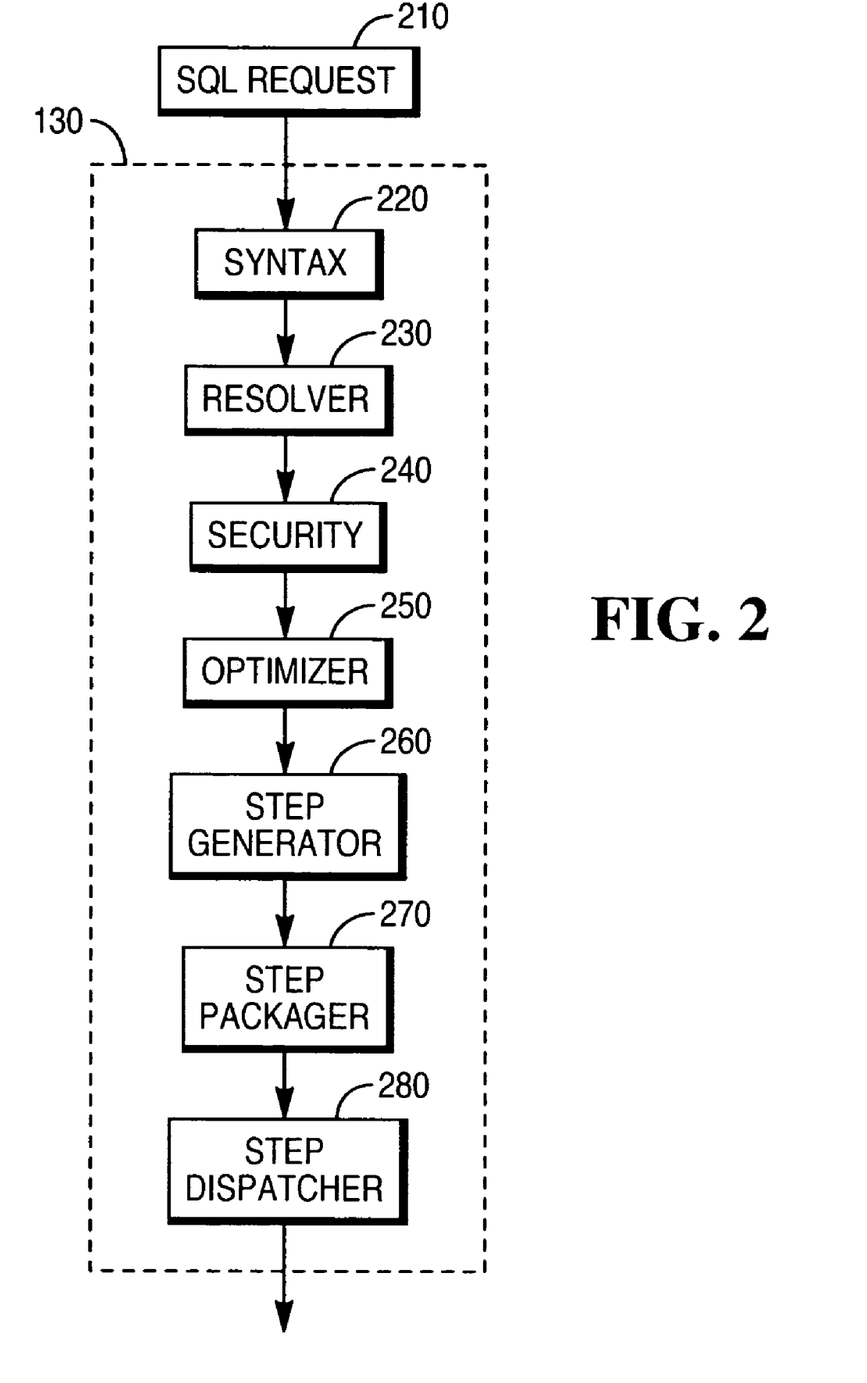
FIG. 2 is a block diagram of a parsing engine.

FIG. 2 components of the parsing engine 130. An SQL request 210 is submitted to the parsing engine 130 and is initially checked for syntax 220. The resolver 230 then checks for and reports semantic errors and determines additional conditions based on transitivity. If one condition requires that the price is $ 10 and another requires that the cost is half the price, a third condition can be determined by transitivity: the cost is $5. The new conditions can be redundant with the original conditions, but can result in faster execution. For example, it is possible for a query to run more quickly with conditions of price=$10 and cost=$5 than with conditions of price=$10 and cost=50% (price).

Once the query has been processed by the resolver 230, it is passed to the security component 240 of the parsing engine 130. The security component 240 checks the security level of the database user who initiated the query. The security component 240 also checks the security level of the information sought by the request. If the user's security level is less than the security level of the information sought, then the query is not executed.

Once the query passes security it is analyzed by the optimizer 250. The optimizer 250 determines possible series of steps for executing the query. The optimizer 250 can review characteristics of the data that needs to be manipulated to determine the query result by accessing a database system dictionary that stores information about the data. The optimizer 250 can also review the physical configuration of the database system, such as the number of nodes and the number of processing modules, as well as the hardware characteristics, such as the access and transfer speeds for the data storage facilities and the network 115.

The optimizer 250 uses a cost model to estimate the costs associated with each series of steps. The cost associated with a series of steps is related to the amount of data encompassed by each condition corresponding to a step in the series. The execution of a query involves temporary results (e.g., a spool) and sub-query results and the amount of data in those results is one factor in determining the costs of executing the query. A temporary result that requires a large amount of system resources to generate has a high cost.

After estimating the costs associated with potential query execution plans, the optimizer 250 chooses the plan that has the lowest estimated cost. The more accurate the estimates of cost for particular execution plans, the more likely the optimizer 250 is to choose the correct plan. The optimizer 250 can access statistics describing the information stored in the database to help determine the impact of conditions and temporary results corresponding to steps in query execution plans.

The plan chosen by the optimizer 250 is passed to the step generator 260. The steps are then sent to the step packager 270 and dispatched from the step dispatcher 280. If the plan chosen is not the optimal plan, the steps generated will require the use of more resources than the steps that would be generated by another plan that yields the same output. In a parallel database system servicing thousands of concurrent users, an increase in the resources employed for each query can result in longer wait times for every user.

Figure 3:
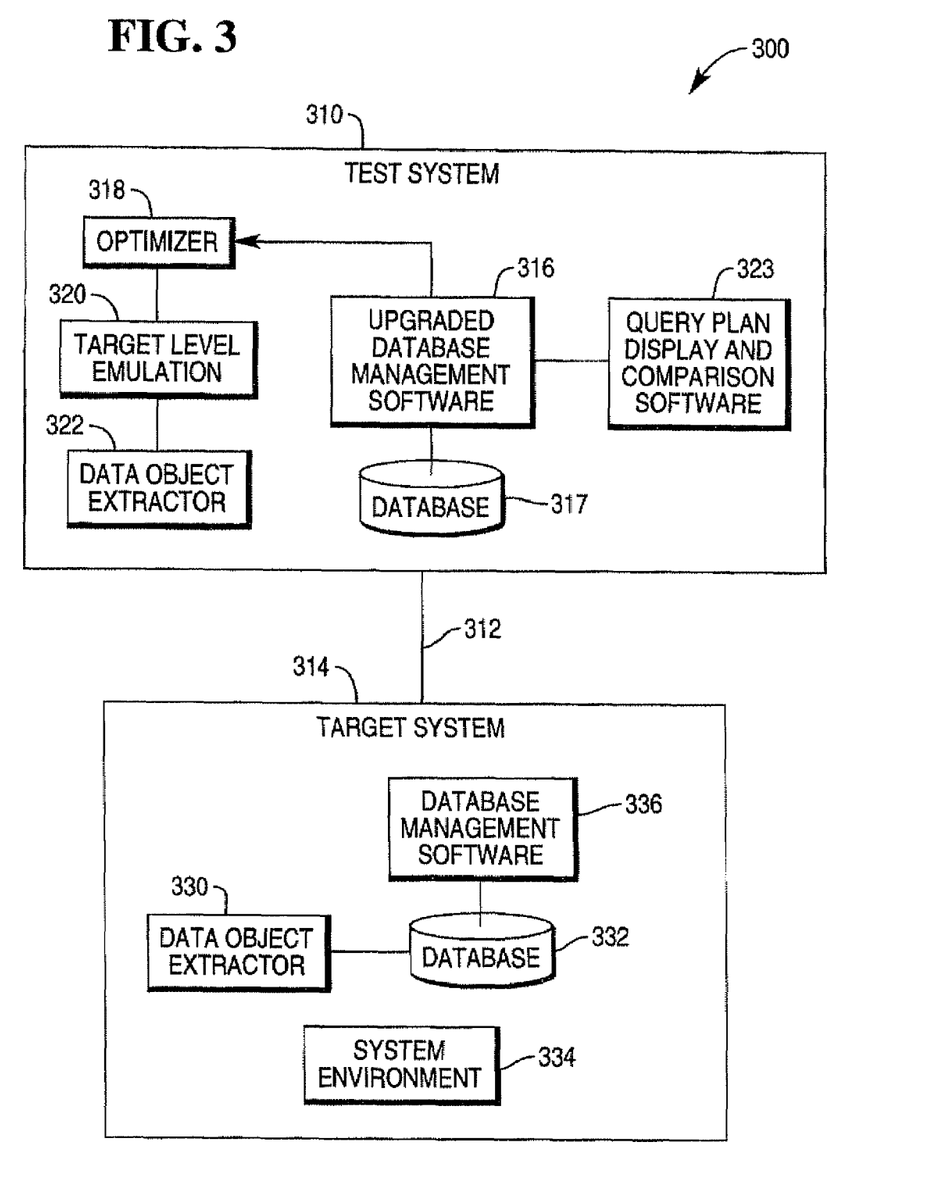
FIG. 3 is a block diagram depicting an upgraded test system coupled to a target system using an older database management software version.

Referring to FIG. 3, a pair of connected systems 300 is illustrated. The target system 314 represents a user or customer system on which software is executed. Thus, for example, the target system 314 is located at a customer site. In one example application, the software running in the target system 14 includes database management software 336, e.g., data warehouse applications. The database management software 336 used on the target system is of a particular version for which there is at least one upgrade available. In the target system 314, the database management software 336 manages access requests to a database 332. In accordance with some embodiments, the database 332 includes a parallel database distributed across plural nodes in the target system 314. Thus, the target system 314 can be a multi-node parallel processing system (sometimes referred to as a massively parallel system or MPP). An example of such a system has been discussed with regard to FIGS. 1 and 2. Alternatively, the target system 314 is a single-node system having plural processors (sometimes referred to as a symmetric processing system or SMP).

The target system 314 maintains a system environment 334, which is made up of system-specific information as well as database-level information of the target system 314. Thus, as used here, "environment information" of a target system refers to the system-specific information, database-level information, or any portion of the system-specific or database-level information. System-specific information includes such information as the number of nodes in the target system, the number of CPUs per node, the number of virtual processors in each node, the type of CPUs, the input/output rates of the disks, CPU speeds, physical memory size, and other system information. Database-level information includes statistics (which can include comprehensive statistics or statistics based on random processing module samples), data manipulation language (DML) statements, database object definitions defined by data definition language (DDL) statements, and the actual data of the database itself. In one embodiment, actual data of the database is not exported from the target system 314. Statistics include information on how data is structured in the database, the number of rows in a table, the data demographics of a table, and highest and lowest values of a column. Statistics may be sampled randomly from each node of a target system 314 or from random nodes or processing modules. DDL statements affect the structure of database objects, and may include statements such as SQL (Structured Query Language) CREATE statements (to create databases, indexes, tables, etc.). DML statements are statements that manipulate data, such as the DELETE statement (to remove rows from a table), INSERT statement (to add new rows to a table), SELECT statement (to perform a query by selecting rows and columns from one or more tables), UPDATE statement (to change data in a table), and so forth.

A test system 310 is coupled to the target system 314 over a data network 312. The data network 312 may be a private network, or it may be a public network such as the Internet. For privacy in a public network, data exchanged between the test system 310 and the target system 14 can be protected by a security protocol. Communications over the data network 312 can be according to various techniques, including electronic mail, packet-based transfer, file transfer, web browsing, and so forth.

The test system 310 uses database management software 316 that is an upgrade of the database management software 336 used by the target system 314. To optimize queries under the upgraded software in the test system 310 using an environment that emulates the actual target system 314, environment information (one example of environmental information is cost data used by the optimizers cost model) is extracted in the target system 314 and communicated over the network 312 to the test system 310. The target system 314 includes a data object extractor 330 to extract desired environment information. The data object extractor 330 captures system-specific information (also referred to as cost-related information) and database-level information from the target system 314 and communicates the captured environment information over the data network 312 to the test system 310. The data object extractor 330 in the target system 314 cooperates with a data object extractor 322 running in the test system 310. In one embodiment, the data object extractor 322, 330 is a client tool that connects to the database over a network and the same instance can connect to the target system 314 to perform the export and then connect to the test system 310 to do the import. The communication of the extracted data may be performed in a number of different ways, e.g., sent by electronic mail, sent by file transfer, downloaded from a web site, and so forth.

In some embodiments, the data object extraction process occurs in two phases. First, the data object extractor 330 in the target system 314 dumps target environment information (including, for example, cost-related information, statistics, DDL statements, and DML statements) from the target system 314 to the test system 310. After the target environment information is copied from the data object extractor 330 to the test system 310, a second process, referred to as an "apply process," is performed in which the data received from the target system 314 is loaded and/or mapped into appropriate tables or system files in the test system 310. The target environment information that has been loaded into the test system 310 is referred to as target-level emulation data 320. The loading and applying process is performed by the data object extractor 322 running inside the test system 310 (in cooperation with the data object extractor 330 in the target system 314).

The test system 310 further includes an optimizer module 318 for optimizing queries to a database 317 managed by a database management software 316 running in the test system 310. As discussed above, database management software 316 is an upgraded version of database management software 336. The optimizer module 318, therefore, differs to some extent from the optimizer, for example optimizer 250, that is used by target system 314. For more accurate upgrade performance determinations, the optimizer module 318 uses target-level emulation data 320 that has been communicated from the target system 314 to the test system 310. Based on the target-level emulation data 320, the optimizer module 318, while in emulation mode (e.g., while emulating the target machine by interpreting all of the environmental data), selects the most efficient query plan (or one of the more efficient query plans) for a query used on the target system 314. Hooks in the optimizer module 318 enables the optimizer module 318 to access target-level emulation data 320 stored in tables on the test system 310.

In addition to more accurate performance of the upgraded optimizer module 318, target-level emulation for upgrade validation like that described here also allows systems less sophisticated than a target parallel system to accurately emulate query plan generation (and associated cost estimates) for an upgraded version of database management software for target parallel systems. In fact, many test systems 310 are as simple as laptop computers loaded with the appropriate software, including the data object extractor 322, the optimizer module 318, the upgraded database management software 316, and the database 317. Consequently, using the target-level emulation feature in accordance with some embodiments, a more convenient, flexible, and cost effective upgrade validation method and system is provided to more accurately test query plan generation of upgraded database management software running in target systems.

For a given query, the optimizer module 318 in a parallel relational database system identifies an access plan (query plan, join plan, or strategy) that will reduce the estimated response time of the query. The response time is the amount of time it takes to complete the execution of the query on the given target parallel system. One technique of query optimization uses a cost model to estimate the response time of a given query plan and to search the space of query plans to return a plan with a low cost. In the cost-based optimization model, different methods for doing a unit of work is compared and the most efficient method is selected (the plan with the lowest cost). Because the number of alternatives may be quite large, especially in a parallel system with a large number of nodes running a large relational database, the query optimizer module 318 uses statistics and/or sampling techniques to reduce the search space in optimizing queries. One example is a technique known as the Greedy Search algorithm.

Figure 4:
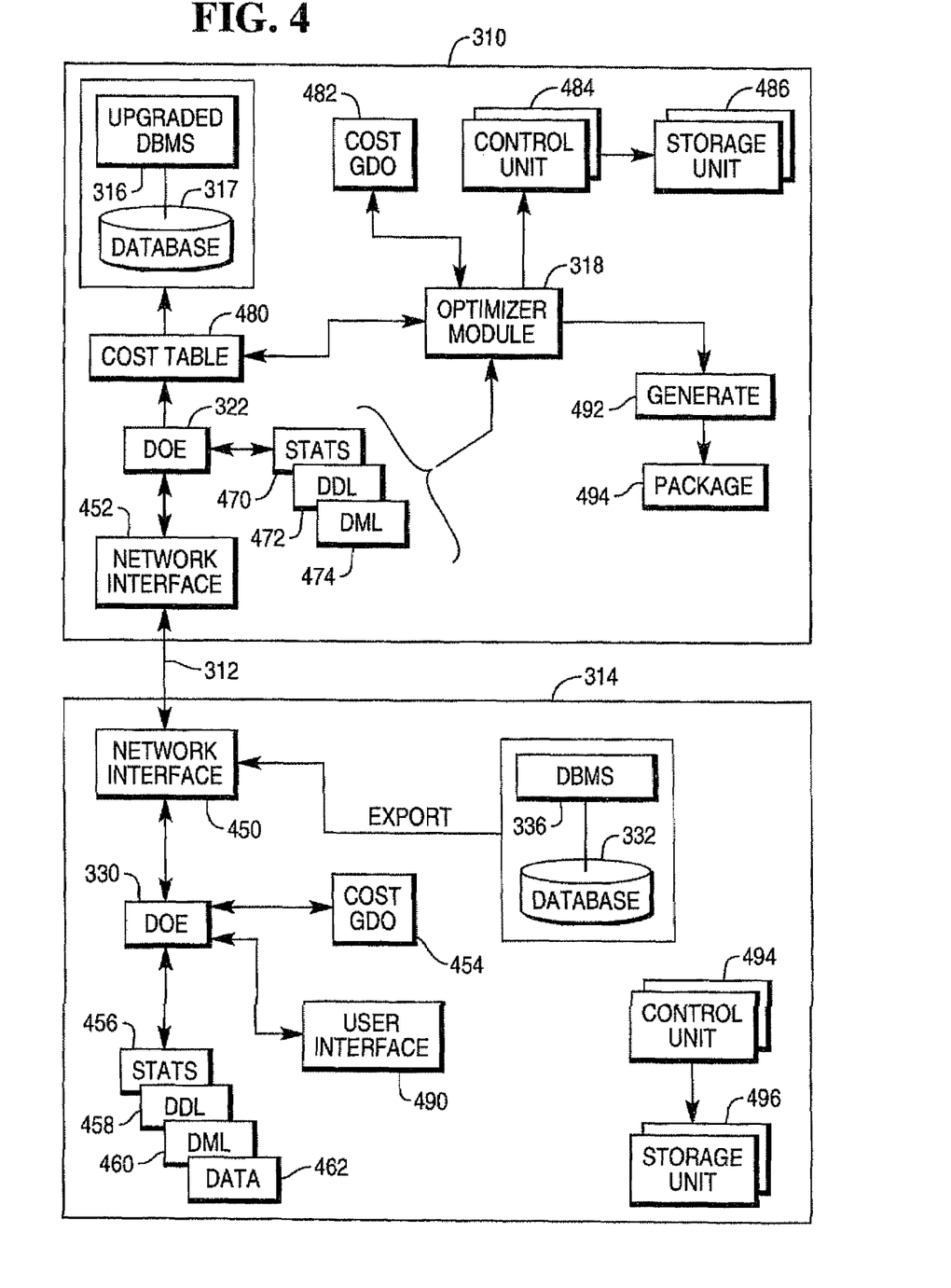
FIG. 4 is a block diagram depicting components of an upgraded test system and a target system using an older database management software version.

Referring to FIG. 4, components of the target system 314 and the test system 310 are illustrated in greater detail. As discussed above, the target system 314 contains various database-level information, including statistics 456, DDL statements 458, DML statements 460, and actual data 462 associated with the database 332. In addition, cost related information may be contained in configuration files 454. In one embodiment, the configuration files 454 are referred to as cost global distributed objects (GDO).

The cost GDO 454 contains cost parameters and cost constants that may affect performance of various queries. The cost parameters include, as example, the number of nodes of the corresponding system, the number of CPUs per node, the number of processing modules per node, the amount of memory per processing module, MIPS (millions of instructions per second) per CPU, disk array access speeds, disk access speeds, and network access speeds. Cost constants specify transfer rates for each kind of storage media and network interconnect in the target system 314. The target system 314 determines the values for the cost constants at start-up and puts the appropriate sets of values into cost GDO 454. Thus, for example, cost constants may be specified for different types of disk arrays, such as disk arrays from different manufacturers or of different models. Although one embodiment treats the cost parameters and cost constants as separate components, the distinction may be removed in further embodiments.

To export or extract target information, the data object extractor 330 provides a user interface 490 through which a user may select desired information to export or dump into the test system 310. The user interface 490 may, for example, provide command lines, graphical user interface icons, and so forth to access the desired information in the target system 314. For example, the cost parameters and cost constants may be extracted into one or more files (such as in binary format or in some other format) for communication through network interfaces 450 and 452 in respective systems 314 and 310 over the network 312. Desired statistics 456, DDL statements 458, and DML statements 460 may also be extracted and communicated across the network 312 to the test system 310.

The user interface 490 can be configured to allow a user to select the desired types of data to capture. One option that can be provided is an "ALL" option, which causes the data object extractor 330 in the target system 314 to capture all selectable types of environment information. Alternatively, individual types of environment information may be selected by selecting a "STATISTICS" option (to capture statistics data), a "COST PARAMETERS" option (to capture cost-related information), a "QCD" option (to capture query capture database information, which are databases that contain query information), a "TABLE DEFINITIONS" option (to capture DDL), and a "RANDOM AMP SAMPLING" option (to capture random AMP samples). The user interface can also receive a file name from the user to identify the file to which the captured information is dumped.

In another embodiment, the user interface 490 allows the user to specify one or more queries run on the target system 314. The data object extractor 330 then captures all environmental information that is relevant to those queries. For example, the data demographics for tables that are not involved in the query need not be extracted. In this embodiment, the query and the query plan developed by the target system 314 using the database management software 336 that has not been upgraded are also sent by the target system 314 over the network 312 and received by the test system 310.

The extracted information received from the target system 314 (e.g., by electronic mail, file transfer, web download, etc.) is applied to appropriate locations in the test system 310 (e.g., relational tables, files, and other locations). While creating the database objects, the data object extractor 322 automatically handles any interdependencies. For example, the extracted statistics, DDL statements, and DML statements may be stored in locations 470, 472, and 474, respectively, by the data object extractor 322 running in the test system 310.

In addition, by use of a diagnostic query statement, the data object extractor 322 maps the extracted cost information into a cost table 480, which is a relational table. If random statistical information has been sampled, it is included in the mapping. In one embodiment, the diagnostic query statement, which is a SQL statement, includes a diagnostic Dump Costs statement. The diagnostic Dump Costs statement is used during export to dump the extracted cost information so that on import it can be inserted into one or more rows of the cost table 480.

Another SQL diagnostic query statement is a diagnostic Set Costs statement, which directs the optimizer module 318 in the test system 310 to use the environmental cost parameters as defined in the cost table 480 when performing optimization tasks. The Set Costs statement can also specify at which level optimization is to be performed. In one embodiment, separate levels are defined, including a Request level, a Session level, an IFP (interface processor) level, and a System level. When the Request level is selected, the optimizer module 318 is directed to use the appropriate values of the cost table 480 for the current request. When the Session level is selected, the optimizer module 318 is directed to use appropriate entries of the cost table 480 for the current user session. A system has multiple sessions, with one session assigned to each user of the system. In a session, multiple requests can be issued. When the IFP level is selected, the optimizer module 318 is directed to use the cost table 480 for the current IFP. When the system level is selected, the optimizer module 318 is directed to access the cost table 180 to create a cost GDO 482. Effectively, at the system level, the cost information transferred from the target system 314 is used by the optimizer module 318 for the entire system, for all IFPs, for all sessions, and for all requests. The level defines the scope for which the emulated cost information will be used by the optimizer module 318.

Figure 5:
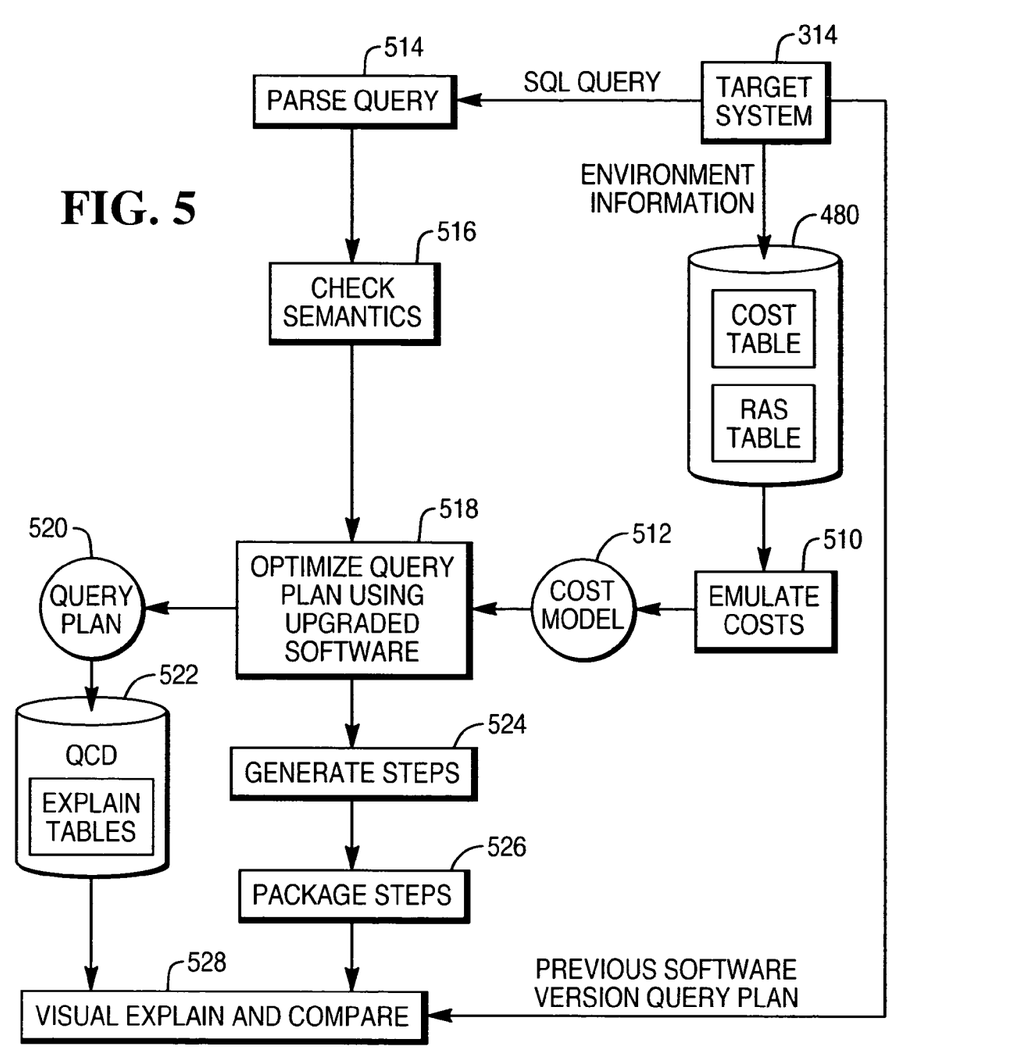
FIG. 5 is a flow chart of information flow to and within an upgraded test system.

FIG. 5 is a flow chart of information flow to and within an upgraded test system 310. The cost table 480 is based on environment information received from the target system 314. The RAS table 480 includes randomly sampled statistics. In one embodiment, using contents of the cost table 480, the test system 310 emulates (at 510) the selected target environment (as selected by the Set Costs statement). The emulation provides a cost model 512 from which the upgraded optimizer module 318 performs its optimization tasks. In another embodiment, the contents of the RAS table 480 can also be used by the test system 310 to emulate the selected target environment. The DIAGNOSTIC SET SAMPLES statement can be used to enable or disable the use of randomly sampled statistics in the emulation process.

An SQL request that is used on the target system 314 is received by a parser 514, with the query parsed (at 514) and the semantics of the query checked (at 516). The parsed query is then forwarded to the upgraded optimizer module 318, where the query is optimized (at 518) using the upgraded software to identify the most efficient (or lowest cost) access plan given the emulated costs and the upgraded database management software. A generator 524 is then used to generate steps associated with processing of a query, and a packaging module 526 is used to create a linear set of steps.

A query plan 520 generated by the optimizer module 318 for a given query is also inserted in detail into relational Explain tables in a query capture database (QCD) 522. This can be performed by using the SQL Insert Explain statement. The query plans are displayable by a visual explain and compare tool 528, which a user can use to analyze a query plan produced by the upgraded optimizer module 318 in comparison to the previous software version query plan received from the target system 314. The visual explain and compare tool 528 enables a user to view the execution or query plan followed to execute a specified SQL statement. The comparison can include a step-by-step illustration of differences and the estimated resources required to execute each plan. For example, the estimated system time (actual query run time is dependent on available system resources) required for each plan can be illustrated. The comparison displayed by the tool 528 can include system configuration, step information, join order, residual conditions, join conditions, source attributes, target attributes and indexes used.

In one embodiment, the visual explain and compare tool 528 provides a graphical user interface in which steps of the query plan are depicted as icons or other image elements, with icons connected by lines to represent the flow of the steps in the query plan. The icons that are displayed by the visual explain and compare tool 528 are designed to represent database operations performed on data rows such as relational algebra operations (e.g., select, project, join); physical algebraic operators such as nested join, merge join, hash join, and so forth; data movement/organization operations such as sorts, redistribution, duplication; and database objects such as tables and views.

By using the visual explain and compare tool 528 to compare the plan generated for the query by the upgraded database management software and its expected performance with the plan and performance under the older software, problems can be addressed prior to the upgraded system being upgraded. In addition, by modifying the environmental information, for example by changing entries in the cost table 480, the user can tune the query for optimal performance under the upgraded database management software. Based on this analysis, the user can suggest changes in the customer platform to improve performance of their parallel database once upgraded.

The optimizer module 318 includes cost functions that are called to perform optimization tasks. The cost functions are used to determine costs based on the environment attributes, which have been downloaded from the target system 314. For example, the cost functions may include a FindNumBlocks function, which calculates the number of blocks in a relation. Another function is the DiskCost function, which calculates the cost of disk operation. A VAMPsPerCPU function returns the number of VAMPs or VPROCs for an operation. A VAMPsPerPMA function returns the number of VAMPs or VPROCs for each node. An OptRDup function computes the cost of a row duplication. Various other cost functions also exist in the test system 310 that can be called by the optimizer module 318.

Figure 6:
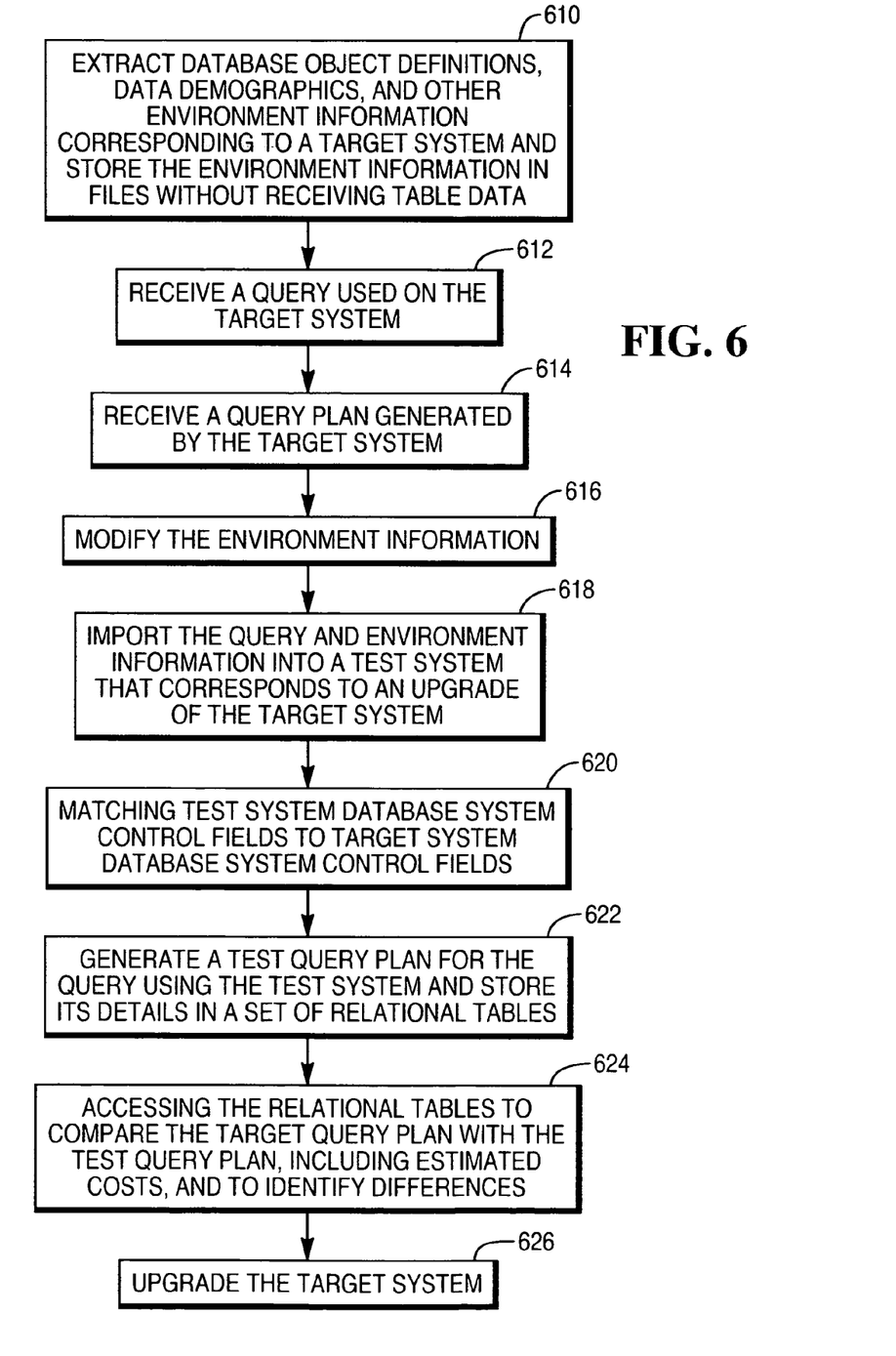
FIG. 6 is a flow chart of a method for upgrade validation of database query plans.

FIG. 6 is a flow chart of one specific embodiment of a method for upgrade validation of database query plans. In step 610, database object definitions, data demographics, and other environment information corresponding to a target system are extracted and stored in files without receiving table data. The target system uses database management software for which an upgrade is available. In step 612, a query used on the target system is received. In step 614, a query plan generated by the target system is received. In step 616, the environment information is modified. For example, a database can be renamed or the size of a table increased. In step 618, the query and environment information are imported into a test system that corresponds to an upgrade of the target system's database management software. In step 620, the test system database system control fields are modified to match the target system database system control fields. In step 622, a test query plan for the query is generated using the test system and stored in detail in a set of relational tables. In step 624, the relational tables are accessed to compare the target query plan with the test query plan, including estimated costs, and to identify differences. In step 626, the target system is upgraded to run the database management software version of the test system.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for validating query plans for an upgrade, comprising the steps of:
    receiving environment information corresponding to a target system;
    receiving a query used on a database management software on the target system;
    receiving a target query plan generated by the database management software on the target system;
    importing the query and the environment information into a database management software on a test system;
    generating a test query plan for the query using the database management software on the test system;
    comparing the target query plan with the test query plan as part of validating the test query plan, where the database management software on the test system is an upgrade of the database management software on the target system;
    addressing problems identified when comparing the target query plan with the test query plan; and
    upgrading the database management software on the target system.

2. The method of claim 1, where the environment information includes database object definitions.

3. The method of claim 1, where the environment information includes data demographics.

4. The method of claim 1, where the environment information does not include table data.

5. The method of claim 1, wherein upgrading the database management software on the target system comprises the step of upgrading the database management software on the target system to correspond to the database management software on the test system.

6. The method of claim 1, where the environment information is a subset of all environment information corresponding to the target system and the subset includes only environment information that is relevant to the query.

7. The method of claim 1, further comprising the step of modifying the environment information prior to generating the test query plan.

8. The method of claim 1, further comprising the step of configuring database system control fields of the database management software on the test system to match database system control fields of the database management software on the target system.

9. The method of claim 1, where generating a test query plan includes storing details of the test query plan in a set of relational tables.

10. The method of claim 9, where comparing the target query plan with the test query plan includes accessing the relational tables and comparing estimated costs for each plan.

11. The method of claim 1, where comparing the target query plan with the test query plan includes identifying differences in the steps of each plan.

12. The method of claim 1, where the test system emulates the target system with an upgraded database management software.

13. The method of claim 1, where the environment information includes Cost Level Validation: a Request level, a Session level, an IFP (interface processor) level, and a System level.

14. Computer software, stored on a tangible storage medium, for validating query plans for an upgrade, the computer software comprising executable instructions that cause at least one computer to:
    receive environment information corresponding to a target system;
    receive a query used on a database management software on the target system;
    receive a target query plan generated by the database management software on the target system;
    import the query and the environment information into a database management software on a test system;

generate a test query plan for the query using the database management software on the test system;

compare the target query plan with the test query plan as part of validating the test query plan, where the database management software on the test system is an upgrade of the database management software on the target system;

address problems identified when comparing the target query plan with the test query plan; and upgrade the database management software on the target system.

15. The computer software of claim 14, where the environment information includes database object definitions.

16. The computer software of claim 14, where the environment information includes data demographics.

17. The computer software of claim 14, where the environment information does not include table data.

18. The computer software of claim 14, wherein the executable instructions that cause the at least one computer to upgrade the database management software on the target system comprises executable instructions that cause at least one computer to upgrade the database management software on the target system to correspond to the database management software on the test system.

19. The computer software of claim 14, where the environment information is a subset of all environment information corresponding to the target system and the subset includes only environment information that is relevant to the query.

20. The computer software of claim 14, further comprising executable instructions that cause at least one computer to modify the environment information prior to generating the test query plan.

21. The computer software of claim 14, further comprising executable instructions that cause at least one computer to configure database system control fields of the database management software on the test system to match database system control fields of the database management software on the target system.

22. The computer software of claim 14, where the least one computer generates a test query plan by at least storing details of the test query plan in a set of relational tables.

23. The computer software of claim 22, where the least one computer compares the target query plan with the test query plan by at least accessing the relational tables and comparing estimated costs for each plan.

24. The computer software of claim 14, where the least one computer compares the target query plan with the test query plan by at least identifying differences in the steps of each plan.

25. A system for validating query plans for an upgrade, comprising:

an interface to receive environment information corresponding to a target system, a query used on a database management software on the target system, and a target query plan generated by the database management software on the target system;

a test system using a database management software that is an upgraded version of the database management software used by the target system and configured in accordance with the environment information;

the database management software on the test system including an optimizer module that is coupled to the interface to receive the query and generates a test query plan;

a query plan comparison tool coupled to the database management software on the test system and the interface to receive the test query plan and the target query plan and configured to display a comparison of the plans as part of validating the test query plan;

a tool for addressing problems identified when comparing the target query plan with the test query plan; and a tool for upgrading the database management software on the target system.

26. The system of claim 25, where the environment information includes database object definitions.

27. The system of claim 25, where the environment information includes data demographics.

28. The system of claim 25, where the environment information does not include table data.

29. The system of claim 25, where the environment information is a subset of all environment information corresponding to the target system and the subset includes only environment information that is relevant to the query.

30. The system of claim 25, where the environment information is modified before be imported into the test system.

31. The system of claim 25, where database system control fields of the database management software on the test system match database system control fields of the database management software on the target system.

32. The system of claim 25, where the database management software on the test system stores details of the test query plan in a set of relational tables.

33. The system of claim 32, where the query plan comparison tool accesses the relational tables and displays estimated costs for each plan.

34. The system of claim 25, where the query plan comparison tool displays differences in the steps of each plan.

35. The system of claim 25, where the query plan comparison tool is configured to validate the test query plan and the target query plan are optimal from release to release of software.

* * * * *